Jan. 15, 1957   C. W. MacMILLAN   2,777,327
VIBRATION INDICATOR
Filed June 14, 1954
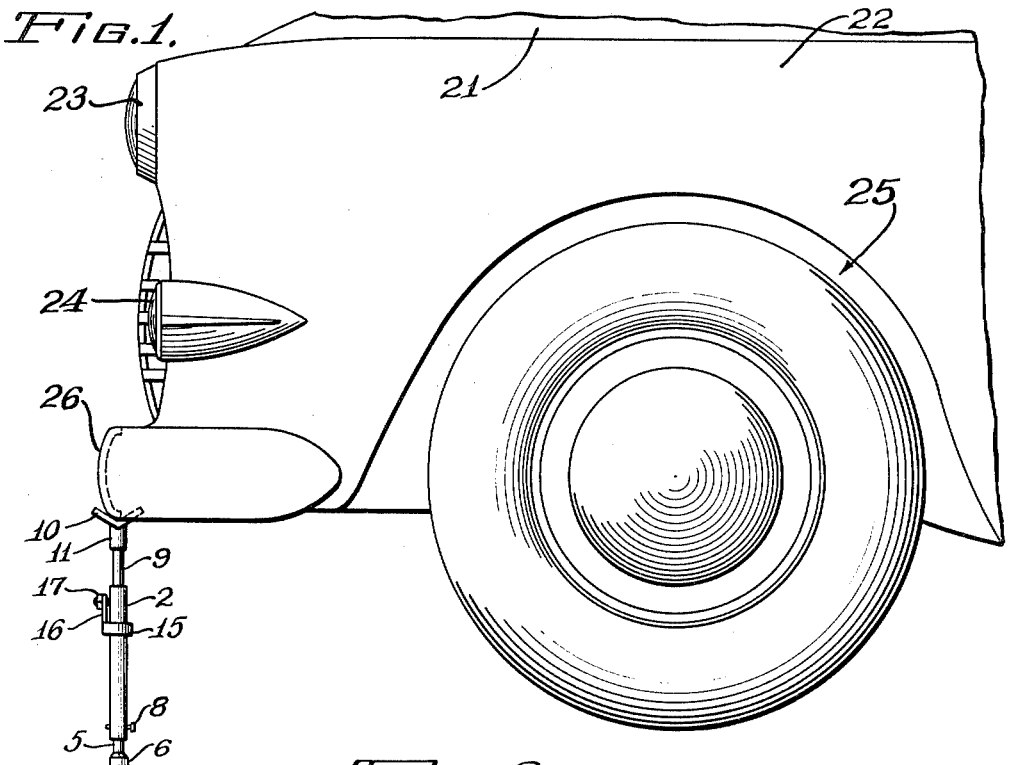
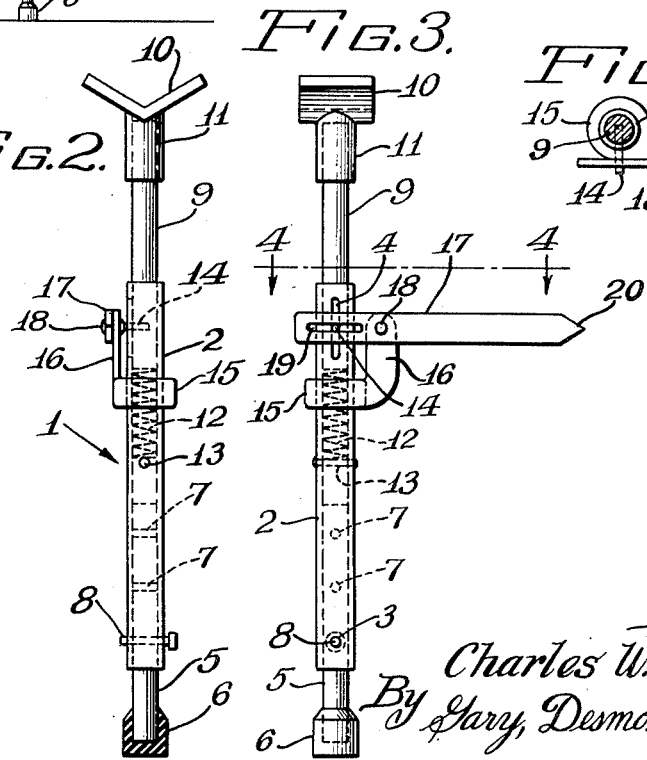
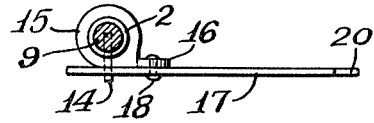
Inventor:
Charles W. MacMillan
By Gary, Desmond & Parker
Attys.

United States Patent Office 2,777,327
Patented Jan. 15, 1957

2,777,327

VIBRATION INDICATOR

Charles W. MacMillan, Rock Island, Ill., assignor to Bear Manufacturing Company, Rock Island, Ill., a corporation of Delaware Application June 14, 1954, Serial No. 436,504

3 Claims. (Cl. 73—457)

This invention relates to improvements in a vibration indicator for use with an automotive vehicle and refers particularly to a vibration indicator which may be employed in conjunction with the testing of static and dynamic balance of the wheels of the vehicle.

In one method of testing the static and dynamic balance of automotive vehicle wheels, the vehicle wheels are tested while they remain on the vehicle. To perform this operation the wheel under test is jacked up and, if the wheel is a front wheel, a conventional "wheel spinner" is employed to rotate the wheel. If the wheel under test is a rear wheel, the wheel may again be jacked up and said wheel may be rotated by the vehicle engine. In either case, however, the balance testing device locates and indicates the condition of unbalance and gives information to the operator as to where on the wheel, and how much, weight must be added to the wheel to bring the wheel into balance. The principal criterion of balance or unbalance, as such, however, resides ultimately in whether or not vibration is present when the wheel is rotated. When the degree of unbalance of the wheel is relatively great there is no difficulty in detecting unbalance since the vehicle is clearly vibrated by the rotation of the unbalanced wheel. However, when the degree of unbalance is slight, vibration can be detected only when the wheel is rotated at a substantially impractical high speed.

The present invention comprises a relatively inexpensive and simple operating device which can detect relatively slight vehicle vibrations and so multiply the indications that an extremely small vibration is readily apparent to an operator.

The uses, objects and features of the present invention will be apparent from the accompanying drawing and following detailed description.

In the drawing,

Fig. 1 is a diagrammatic view of the front portion of an automobile with the indicating device in operative position.

Fig. 2 is an enlarged side elevational view of the indicating device.

Fig. 3 is a front elevational view of the device.

Fig. 4 is a sectional view taken on line 4—4 of Fig. 3.

Referring in detail to the drawing and with particular reference to Figs. 2, 3 and 4, 1 indicates my improved vibration indicating device. The device 1 comprises a tubular member 2 which adjacent its lower portion is provided with a diametrical aperture 3. The tubular member 2 adjacent its upper portion is provided with a relatively elongated slot 4.

Telescopically positioned within the lower portion of the tubular member 2 is a supporting bar 5 having a rubber foot 6 at its lower end. The bar 5 is provided with a plurality of axially spaced diametrically positioned apertures 7, the arrangement being such that the bar 5 and the tubular member 2 may be adjusted to a plurality of fixed positions by the insertion of an adjusting pin 8 through registering apertures 3 and 7. With the foot 6 resting upon the ground, the effective height of the tubular member 2 may be thus adjusted.

A vibration bar 9 may be telescopically positioned in the upper end portion of the tubular member 2, the vibration bar at its upper end carrying a substantially V or chevron shaped bracket 10, the bracket being supported by a tubular sleeve 11 which embraces the upper end of the bar 9. A coil spring 12 is positioned within the tubular member 2 and the upper end portion of said coil spring is adapted to abut the lower end of the vibration bar 9. A fixed pin 13 is transversely positioned in the tubular member 2 and functions to support the lower end of the coil spring 12. Thus, the vibration bar 9 is telescopically positioned within the tubular member 2 and is resiliently movable axially with respect to the tubular member.

A pin 14 is secured transversely to the vibration bar 9, said pin extending outwardly from said bar and through slot 4 provided in the tubular member 2. A collar 15 is rigidly secured to the outer surface of the tubular member 2, said collar carrying a fulcrum arm 16 which extends upwardly to substantially the transverse center of the elongated recess 4. A pointer 17 is pivotally secured, as at 18, to the fulcrum 16. On one side of said pivot, the pointer 17 is provided with an elongated slot 19 through which the protruding end of pin 14 extends. On the opposite side of the pivot pin 18 the pointer 17 is relatively elongated and terminates in a point 20.

Referring particularly to Fig. 1, the front end portion of a conventional automobile is illustrated. The reference numeral 21 indicates the hood of the automobile and the numeral 22 indicates the left front fender of the automobile. A conventional headlight 23 and parking light 24 are carried by the fender 22. The reference numeral 25 indicates generally the left front wheel of the automotive vehicle, and for purposes of describing the use of the invention, the wheel 25 will be the one which is being tested for balance. The reference numeral 26 indicates the front bumper of the automobile.

In employing the present invention the wheel 25 whose balance is to be tested is jacked up by a conventional jack (not shown). In jacking up the wheel 25, the bumper 26 is also raised. The device 1 is then positioned beneath the bumper 26 and the pin 8 is so positioned in the recesses 3 and 7 so that the bracket 10 is brought into contact with the lower edge of the bumper 26. If the bracket 10 does not make contact with the lower edge of the bumper 26, that is, if the bumper 26 is too high, the jack employed to raise the wheel 25 may be lowered a sufficient degree to permit the lower edge of the bumper 26 to make contact with the bracket 10. Of course, in view of the fact that the bar 9 is resiliently associated with the tubular member 2, adequate contact between the bracket 10 and the lower edge of the bumper 26 may be secured by compressing spring 12 to a degree.

With the device 1 positioned beneath the bumper 26 as hereinbefore described, the wheel 25 is rotated by a conventional "wheel spinner" (not shown). If the wheel 26 is unbalanced to a relatively great degree, the operator who applies the balance tester (not shown) to the wheel to locate the degree and position of unbalance of the wheel, will, after the degree and position of unbalance of the wheel is ascertained, apply balance weights to appropriate parts of the wheel. The application of the balance weights will undoubtedly bring the wheel 25 to approximate balance. When the wheel is next rotated, undoubtedly the vibration due to the slight unbalance of the wheel will set up a relatively small vibration in the body of the automobile including the bumper 26. Although this vibration may be of such small amplitude that it could not be observed by the operator directly, such vibration causes axial movement of the vibration bar 9. Axial vibration of the bar 9 is thus transmitted to the tail end of the pointer 17. By virtue of the difference in the lever arms of the tail end and head end of the pointer 17, the amplitude of vibration of the bar 9 will be greatly multiplied and the end 20 of the pointer 20 will described a readily discernible arc. In this fashion the operator is advised that the balance of the wheel 25 is not perfect. The operator can then make necessary weight adjustments and when, upon rotation of the wheel 25, no visible oscillation of the point 20 is discernible, the operator can be assured that the wheel 25 is in substantially perfect balance.

In addition to utilizing the device 1 as an appurtenance to the balancing of an unbalanced wheel, said device may be employed as a quick indicator of the condition of balance of an automobile wheel. Accordingly, it is not intended that the present invention be specifically limited to the example of its use hereinbefore set forth.

I claim as my invention:

1. A vibration indicating device which comprises, a tubular member, means for supporting said tubular member at one end portion thereof, a vibration bar telescopically carried at the opposite end portion of said tubular member for axial movement within said tubular member, resilient means carried within said tubular member and bearing upon an end of said vibration bar for resiliently holding the opposite end thereof in contact with a body the vibrations of which are to be indicated, said tubular member being stationary and independently supported relative to said body, a fulcrum rigidly mounted upon said tubular member, a pointer pivotally carried by said fulcrum, means for pivotally and slidably connecting a portion of said pointer on one side of said fulcrum to said vibration bar whereby axial movement of said bar swings said pointer about said fulcrum, and means for adjusting said supporting means to predetermined positions lengthwise with respect to said tubular member.

2. A vibration indicating device which comprises, a tubular member, a rod telescopically positioned in one end of said tubular member for supporting said tubular member, a vibration bar telescopically carried in the opposite end portion of said tubular member for axial movement parallel to the axis of said tubular member, one end portion of said bar extending outwardly from the end of said tubular member, resilient means carried within said tubular member, rigid means carried by said tubular member against which said resilient means bears at one end, the opposite end of said resilient means bearing upon the opposite end of said vibration bar for resiliently holding the extending end of said bar and urging it outwardly into contact with a body the vibrations of which are to be indicated, said tubular member being stationary and independently supported relative to said body, a fulcrum rigidly mounted upon said tubular member, a pointer pivotally carried by said fulcrum with its axis transverse to the axis of said vibration bar, and means connecting a portion of said pointer on one side of said pivot to said vibration bar whereby axial movement of said bar swings said pointer about its pivot.

3. A vibration indicating device which comprises, a tubular member, a rod telescopically positioned in one end of said tubular member for supporting said tubular member, a vibration bar telescopically carried in the opposite end portion of said tubular member for axial movement with respect to said tubular member, one end portion of said bar extending outwardly from the end of said tubular member, resilient means carried within said tubular member and bearing upon the opposite end of said vibration bar for resiliently holding the extending end thereof in contact with a body the vibrations of which are to be indicated, a fulcrum rigidly mounted upon said tubular member, a pointer pivotally carried by said fulcrum with its axis transverse to the axis of said vibration bar, said tubular member being provided with an axial slot, said pointer also being provided with an axial slot, a pin carried by said vibration bar and extending through both slots whereby vibration of said bar swings said pointer about said fulcrum, and means for adjusting said supporting rod to predetermined positions lengthwise with respect to said tubular member.

References Cited in the file of this patent

UNITED STATES PATENTS

| | | |
|---|---|---|
| 1,641,447 | McGall | Sept. 6, 1927 |
| 2,349,552 | Holmes | May 23, 1944 |
| 2,618,153 | McKernan | Nov. 18, 1952 |